United States Patent
Mitterreiter et al.

(10) Patent No.: US 6,671,972 B2
(45) Date of Patent: Jan. 6, 2004

(54) ANGLE MEASURING INSTRUMENT AND ITS USE

(75) Inventors: Johann Mitterreiter, Chieming (DE);
Johann Lahr, Traunwalchen (DE);
Dietmar Richter, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/108,759

(22) Filed: Mar. 28, 2002

(65) Prior Publication Data

US 2002/0162239 A1 Nov. 7, 2002

(30) Foreign Application Priority Data

Mar. 28, 2001 (DE) .......................... 101 15 549

(51) Int. Cl.⁷ ................................. G01B 7/30
(52) U.S. Cl. ........................ 33/534; 33/1 PT
(58) Field of Search ................ 33/534, 1 N, 1 PT, 33/706, 707, 708, 703, 705

(56) References Cited

U.S. PATENT DOCUMENTS

| | | | |
|---|---|---|---|
| 4,495,700 A | 1/1985 | Ernst | 33/1 N |
| 5,290,047 A * | 3/1994 | Duffee et al. | 277/419 |
| 5,311,666 A * | 5/1994 | Jacobsen et al. | 33/1 PT |
| 5,657,544 A * | 8/1997 | Ota et al. | 33/1 N |
| 5,744,706 A * | 4/1998 | Siraky | 33/1 PT |
| 5,941,531 A * | 8/1999 | Parker et al. | 277/369 |
| 6,170,162 B1 * | 1/2001 | Jacobsen et al. | 33/1 PT |

FOREIGN PATENT DOCUMENTS

| | | |
|---|---|---|
| EP | 0 087 521 | 5/1989 |
| JP | 9-178513 | 7/1997 |

* cited by examiner

*Primary Examiner*—Christopher W. Fulton
(74) *Attorney, Agent, or Firm*—Brinks Hofer Gilson & Lione

(57) ABSTRACT

An angle measuring instrument that includes an outer component having a front face and an inner component, wherein the outer component is rotated relative to the inner component about an axis of rotation and the outer component lies further from the axis of rotation than the inner component along a radial direction with respect to the axis of rotation. A seal formed between the outer component and the inner component and wherein the front face includes a conduit, which leads radially outward and is located lower with respect to the front face.

20 Claims, 3 Drawing Sheets

ANGLE MEASURING INSTRUMENT AND ITS USE

Applicants claim, under 35 U.S.C.§119, the benefit of priority of the filing date of Mar. 28, 2001 of a German patent application, copy attached, Serial Number 101 15 549.2, filed on the aforementioned date, the entire contents of which is incorporated herein by reference.

BACKGROUND OF THE INVENTION

1. Field of the Invention

The present invention relates to an angle measuring instrument with two components, which can be rotated in relation to each other. The present invention also relates to the use of this instrument in connection with machine tools, or processing centers, or printing presses.

2. Discussion of Related Art

Angle measuring instruments of this type are used for measuring the rotations of a shaft over one or several revolutions. In this case, the rotation is detected either incrementally or absolutely, as a function thereof the issued measured value is a sequence of counting pulses, a count value or a code word. In connection with toothed racks or threaded spindles it is also possible to measure linear movements with such angle measuring instruments. Angle measuring instruments are employed in connection with machine tools in particular, or in processing centers, both for the measurement of linear and rotary movements. The determination of the angles of rotation to an exactness of a few seconds of angle is of critical importance, for example for turntables or swing heads of machine tools, the C axes of lathes, but also in print units of printing presses. Such angle measuring instruments are often employed at locations where comparably rough conditions of the surroundings prevail. For example, the penetration of lubricants or cooling fluids is a frequent cause of the failure of angle measuring instruments in the operation of machine tools, or processing centers.

An angle measuring instrument is disclosed in Laid Open Document JP 9-178523A, which has a flange on the rotor, so that a gap is created between the flange and the stator element. By the provision of grooves in the flange it is intended during the operation to convey solid particles out of the gap as a result of centrifugal force.

This known angle measuring instrument has the disadvantage that the front face of the stator is not suited to keep standing fluids away from the seal, on the one hand, and on the other to simultaneously serve as an installation surface. Added to this is that the structural space available for the stator housing is not optimally utilized.

OBJECTS AND SUMMARY OF THE INVENTION

An object of the present invention is therefore based on providing an angle measuring instrument into which fluids from the surroundings cannot enter.

This object is attained by an angle measuring instrument that includes an outer component having a front face and an inner component, wherein the outer component is rotated relative to the inner component about an axis of rotation and the outer component lies further from the axis of rotation than the inner component along a radial direction with respect to the axis of rotation. A seal formed between the outer component and the inner component and wherein the front face includes a conduit which leads radially outward and is located lower with respect to the front face.

It is intended to employ the angle measuring instrument in accordance with the present invention in rotatable elements of machine tools, or processing centers, or printing presses, in particular with turntables of machine tools.

Accordingly, the angle measuring instrument includes a component located on the inside and a component located on the outside which advantageously completely encloses the one located on the inside over the circumference. The component located on the inside is often designed as a rotor, in particularly a rotatable hollow shaft. In that case, the component located on the outside is designed as a stator, whose flange-like designed housing element is simultaneously used in a preferred embodiment as an installation face, for example on a turntable of a machine tool.

Because of this structural shape, the angle measuring instrument can be mounted simply and precisely on a provided installation surface. Further than that, by the device in accordance with the present invention it is possible to assure a satisfactory utilization of the volume of the housing. Added to this is that, by the construction in accordance with the present invention, the seal and possibly the shaft end are set back in relation to the front face of the stator housing, and therefore are protected to a large extent against exterior mechanical effects.

Further advantages, as well as details of the method in accordance with the present invention ensue from the following description of a possible exemplary embodiment by the attached drawings. In the exemplary embodiment described below, the housing of the angle measuring instrument is made of a steel part and an aluminum part. It is apparent that the present invention is not limited to this selection of materials, it should be stressed that the present invention relates to a structural shape of an angle measuring instrument, or of its use, and not to the selection of the material of one of its components. The use of other materials, for example from the group of plastic materials, is quite customary, in particular for the housing.

DETAILED DESCRIPTION OF THE PREFERRED EMBODIMENTS

Figure 1:
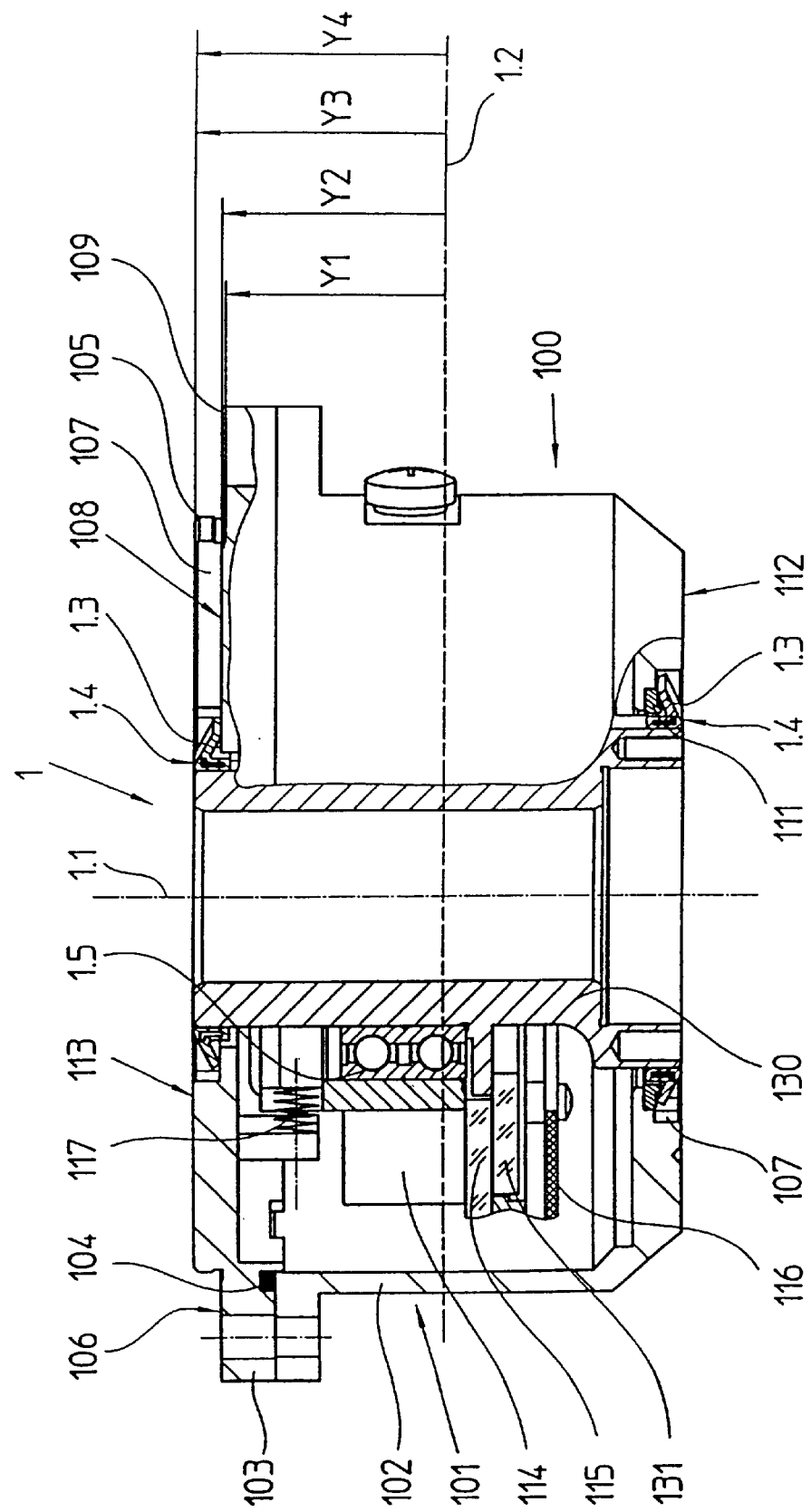
FIG. 1 shows a longitudinal sectional representation of an embodiment of an angle measuring instrument in accordance with the present invention.
Figure 2:
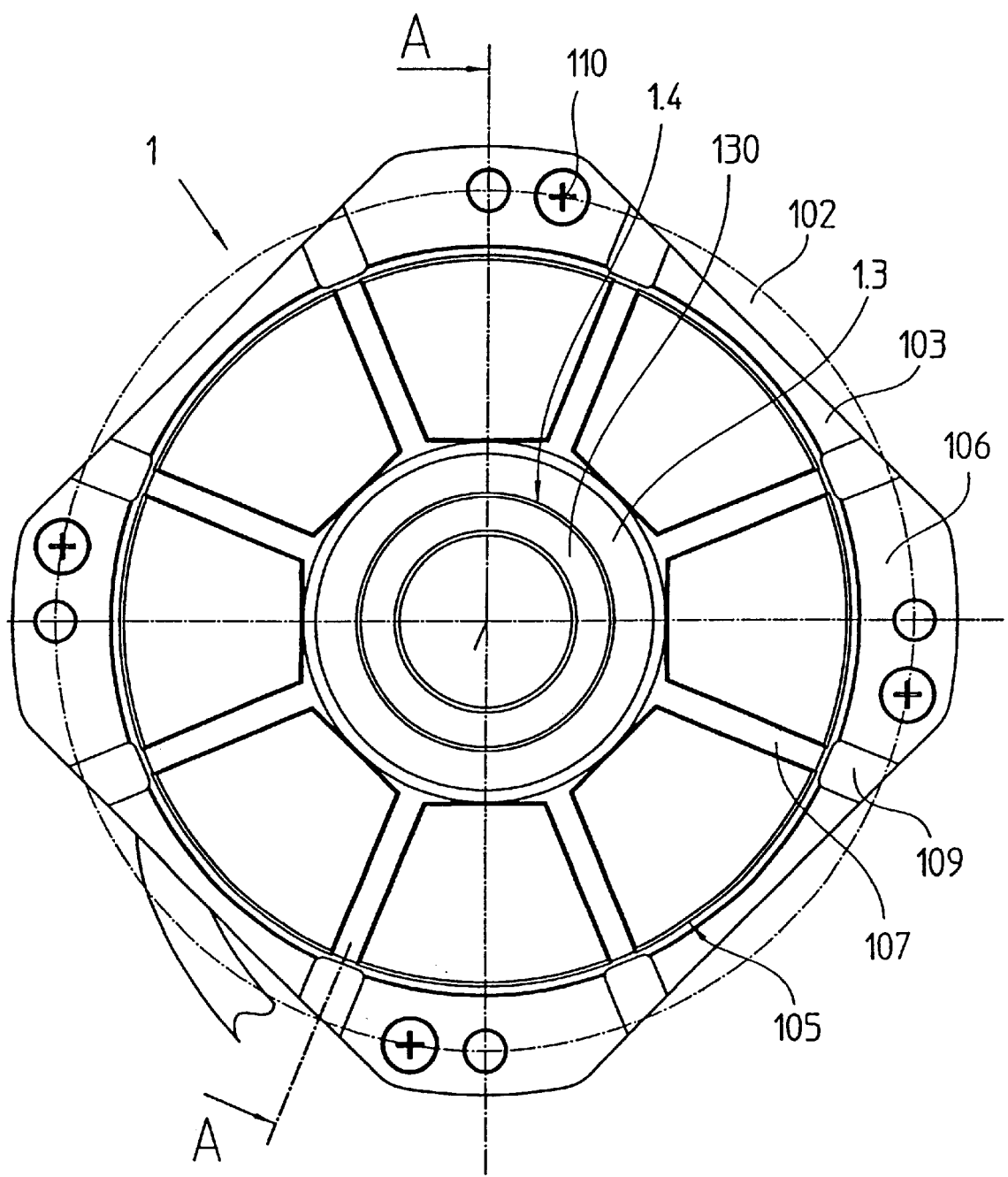
FIG. 2 shows a view from above of an embodiment of a steel flange representing the installation face of the angle measuring instrument of FIG. 1.

According to FIGS. 1 and 2, the angle measuring instrument 1 includes an outer component such as a stator 100 located on the outside relative to an axis of rotation 1.1 and an inner component such as a rotor 130 located nearer the axis of rotation 1.1 than the stator 100. The stator 100 includes a stator housing 101, which is in two parts and includes an aluminum cap 102 and a steel flange 103. The aluminum cap 102, as well as the steel flange 103, respectively have a front face 112, or 113. For one, the stator housing 101 is used for protecting the mechanical measuring devices of the angle measuring instrument against outside influences. It is embodied to be appropriately solid for this purpose. The aluminum cap 102 and the steel flange 103 are screwed to each other with the aid of screws which are introduced into the flange bores 110, wherein the joint face between the aluminum cap 102 and the steel flange 103 is sealed by an O-ring 104. V-shaped seals 1.3 are moreover provided in the annular gap between the rotor 130 and the two front faces 112 and 113 of the stator housing 101. So that the sealing lip of the respective V-shaped seal 1.3 cannot enter into the aluminum cap 102, a comparatively harder steel ring 111 is inserted there on the contact circumference.

The mechanical measuring elements that define an angle measuring structure of the angle measuring instrument 1 include a graduated disk 131 with an angle graduation which is fastened, fixed against relative rotation, on the rotor 130 by gluing, a scanning unit 114 with a scanning plate 115 seated by ball bearings 1.5 on the rotor 130. By a light and a condenser, as well as the scanning plate 115 and the photo elements on a printed circuit board 116, the scanning unit 114 scans the angle graduation of the graduated disk 131. The photoelectrically generated signals are further processed by electronic components on the printed circuit board 116.

Moreover, a coupling 117 is also located inside the stator housing 101. The task of the coupling 117 is to provide a torsion-proof connection between the scanning unit 114 and the stator housing 101, and also to compensate unavoidable eccentricities and angular alignment errors. Reference is made here to the disclosure of EP 0 087 521 B1 of Applicant which corresponds to U.S. Pat. No. 4,495,700, the entire contents of which are incorporated herein by reference.

Figure 3:
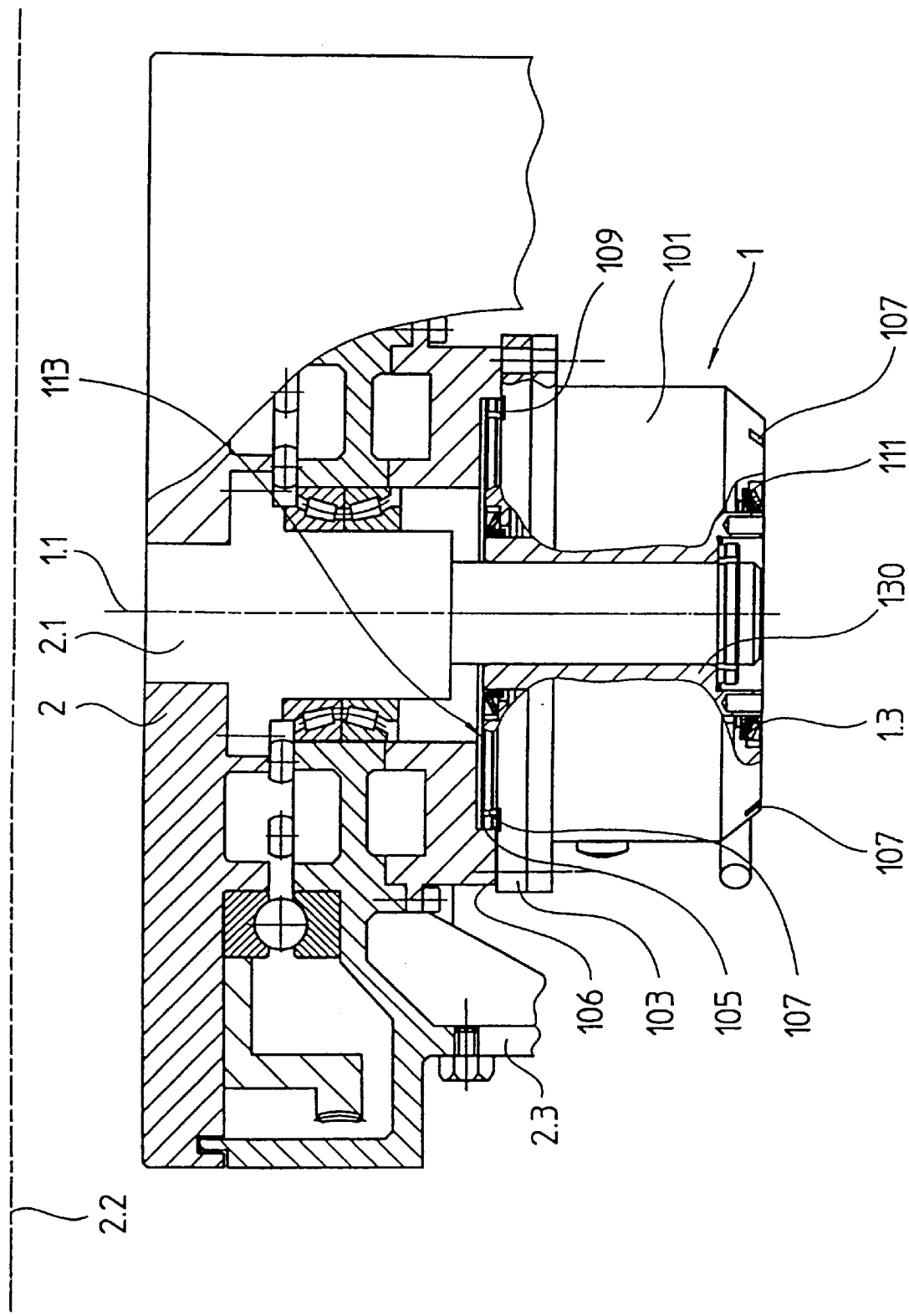
FIG. 3 is a partial sectional lateral view of an embodiment of a measuring system in accordance with the present invention that includes the angle measuring instrument of FIG. 1 installed on an embodiment of a turntable.

Besides the above explained protective function, the stator housing 101 also has the task of assuring an exactly aligned installation on a turntable 2 (see FIG. 3). Shaped surfaces, namely a centering collar 105 and a stop face 106, are provided on the steel flange 103 of the stator housing 101 for this purpose.

The aluminum cap 102, as well as the steel flange 103 have radially outwardly oriented conduits 107, which conduct fluids away toward the exterior. The V-shaped seal 1.3 is arranged in such a way it does not protrude over the raised intermediate areas of the front faces 112, or 113, located between the conduits 107. Because of this, the V-shaped seal 1.3 fastened on the rotor 130 is well protected against exterior influences by the steel flange 103, or the aluminum cap 102. It is moreover possible to utilize the structural space between the conduits 107 inside the stator housing 101 for housing elements, which are part of the mechanical measuring equipment or the associated evaluation elements, for example electronic components. Accordingly, it is possible by the illustrated construction to achieve an increase in the compactness of the angle measuring instrument 1, as well as an optimized utilization of the structural space.

The rotor 130 is seated rotatable around the axis of rotation 1.1 and is accordingly designed as a hollow shaft for receiving a shaft 2.1 of the turntable 2 (see FIG. 3). As already mentioned above, the graduated disk 131, as well as the ball bearings 1.5, are fastened on the rotor 130. The two V-shaped seals 1.3 are also attached, fixed against relative rotation, on the rotor 130, so that no relative movement is possible between the rotor 130 and the V-shaped seal 1.3 during the operation of the angle measuring instrument 1.

Alternatively to that, however, the V-shaped seal 1.3 can also be fixed on the stator housing 101. But the construction with the V-shaped seal 1.3 fixed on the rotor 130 has the advantage over a non-rotating V-shaped seal 1.3 that the fluid on the V-shaped seal 1.3 is moved radially outward by centrifugal forces. Moreover, of course, the present invention is not restricted to V-shaped seals. Instead, any arbitrary suitable structural shape of a shaft seal, for example a labyrinth seal or an O-ring, can be used.

During operation, the angle measuring instrument 1 can be positioned in various work positions. For example, the steel flange 103 can be oriented in such a way that its front face 113 comes to rest horizontally and pointing upward. If now coolant flows on the steel flange 103 from above, it can run off radially through the conduits 107 without the V-shaped seal 1.3 being completely covered by the coolant. This arrangement considerably increases the sealing of the angle measuring instrument 1.

In the same way, dependable operation with respect to the sealing of the angle measuring instrument 1 is also possible in an operating position which is rotated by 180° with respect to the previously described operating position. In this case, the conduits 107 at the front face 112 of the aluminum cap 102 become active.

In the example shown, the conduits 107 are embodied as grooves. However, other shapes for the conduits 107 are also possible. For example, they can be designed as essentially radial bores, or as areas of large surface, which have been cut out of the front faces 112, or 113. In the same way, the conduits 107 can also be embodied as recesses in separate attached elements, for example ring-shaped disks resting on the front face 112, or 113.

The conduits 107 can be provided either on both front faces 112, and 113 of the stator housing 101, as in the represented example, or only at one of these two front faces 112 or 113.

To simplify the further description of the invention, a central cross section 1.2 is introduced in FIG. 1 as a plane of reference in what follows. The central cross section 1.2 is the surface oriented at right angles with respect to the axis of rotation 1.1 and which intersects the angular measuring instrument 1 in the center.

The distance $Y_2$ between the conduit bottom 108 and the center cross section 1.2 is always less than the distance $Y_3$ between the exterior contour 1.4 of the V-shaped seal 1.3 and the center cross section 1.2. The area of the V-shaped seal 1.3 which is at the greatest distance from the center cross section 1.2 is understood to be the exterior contour 1.4 of the V-shaped seal 1.3, which is at the greatest distance from the center cross section 1.2. As shown in this exemplary embodiment, it is especially advantageous if a sealing lip of the respective V-shaped seal 1.3 is arranged obliquely in the form of a roof tile and rests on the conduit bottom 108 and slides thereon.

It is particularly practical if, with an upward pointing horizontal front face 112, or 113 of the angle measuring instrument 1, the sealing area on the rotor side, as well as the stator side, is located above or at the height of the conduit bottom 108, and in no case below the conduit bottom 108. The area is understood to be the sealing area at which the fluid is effectively held back by the seal, or starting from which the fluid can advance no further in the direction of the interior of the housing. Thus, the sealing area can be smaller than the contact area. In the exemplary embodiment shown, the contact area on the rotor 130 extends almost over the entire rotor-parallel leg of the V-shaped seal 1.3, so that the frictional connection between the rotor 130 and the V-shaped seal 1.3 is assured over a sufficiently large contact surface. In contrast thereto, the sealing area is that circumferential area, starting from which the fluid arriving from the exterior cannot advance further along the rotor 130 toward the interior. Accordingly, the sealing area is the outermost circumferential line at which the seal rests tightly against the rotor. In the exemplary embodiment represented, the sealing area on the stator side corresponds to the contact line between the V-shaped seal 1.3 and the conduit bottom 108.

Accordingly, in the example shown, the sealing area on the side of the rotor 130 is located higher than the conduit bottom 108, and the sealing area on the side of the stator lies at the height of the conduit bottom 108. In this way the fluid coming from above is effectively and assuredly diverted into the conduit 107, aided by the rotating movement of the V-shaped seal 1.3 with the centrifugal forces connected therewith.

In the exemplary shape the distance $Y_4$ between the front face 112, or 113, is greater by a few tenths of a millimeter than the distance $Y_3$ (this minimal offset cannot be seen in FIG. 1). This means the V-shaped seal 1.3 is installed in a recessed manner with respect to the front face 112, or 113. It is safely assured in this way that in the installed state the V-shaped seal 1.3 cannot contact parts of the turntable 2, and that therefore no undefined forces can be introduced into the V-shaped seal 1.3 which might possibly have negative effects on the sealing function. In accordance with the exemplary embodiment represented, in the area of the stop face 106 the extension 109 of the conduit 107 is designed in such a way that the latter is at a distance $Y_1$, which is less than the distance $Y_2$. In the exemplary embodiment shown, $Y_1<Y_2<Y_3<Y_4$. The term "greatest distance" in this document means that, with a contour having distances from the center cross section 1.2 which are locally of different size, the distance which is greatest is relevant.

FIG. 3 shows the installation situation of the angle measuring instrument 1 on a turntable 2 of a machine tool. The shaft 2.1 of the turntable 2 is connected, fixed against relative rotation, with the rotor 130 of the angle measuring instrument 1. But the stator housing 101 is fastened on the frame 2.3, so that it cannot rotate around the axis of rotation 1.1. However, the entire angle measuring instrument 1 can be rotated around the pivot axis 2.2. In FIG. 3, the steel flange 103 is represented in a horizontal operating position with the front face 113 on the top. The angle measuring instrument 1 can be mounted in a centered manner with the aid of the centering collar 105. It is moreover assured by means of the stop face 106 that the rotor 130 is aligned in a largely axis-parallel manner with respect to the shaft 2.1. Thus, the two installation surfaces 105 and 106 allow an exactly fitting installation within the required tolerances, or accuracies. Because of the extension 109 of the conduits 107 to the outside of the centering collar 105, in the installed state of the angle measuring instrument 1 the fluid can assuredly escape entirely outside of the centering collar 105.

The foregoing description is provided to illustrate the invention, and is not to be construed as a limitation. Numerous additions, substitutions and other changes can be made to the invention without departing from its scope as set forth in the appended claims.

We claim:

1. An angle measuring instrument comprising:
   an outer component comprising a front face;
   an angle measuring structure located within said outer component and said angle measuring structure generates position signals;
   an inner component, wherein said outer component is rotated relative to said inner component about an axis of rotation and said outer component lies further from said axis of rotation than said inner component along a radial direction with respect to said axis of rotation;
   a seal formed between said outer component and said inner component; and
   wherein said front face comprises a conduit, which leads radially outward and is located lower with respect to said front face.

2. The angle measuring instrument of claim 1, wherein a distance between a bottom of said conduit and a center cross section of said angle measuring instrument is less than or equal to a distance between an outer contour of said seal and said center cross section.

3. The angle measuring instrument of claim 1, wherein a distance between a bottom of said conduit and a center cross section of said angle measuring instrument is less than a distance of a sealing area of said seal to said center cross section.

4. The angle measuring instrument of claim 2, wherein said distance between said bottom of said conduit and said center cross section of said angle measuring instrument is less than a distance of a sealing area of said seal to said center cross section.

5. The angle measuring instrument of claim 1, wherein the greatest distance between a center cross section of said angle measuring instrument and an outer contour of said front face is greater than or equal to a distance between said center cross section and an outer contour of said seal.

6. The angle measuring instrument of claim 2, wherein the greatest distance between said center cross section of said angle measuring instrument and an outer contour of said front face is greater than or equal to said distance between said center cross section of said angle measuring instrument and said outer contour of said seal.

7. The angle measuring instrument of claim 3, wherein the greatest distance between said center cross section of said angle measuring instrument and an outer contour of said front face is greater than or equal to a distance between said center cross section of said angle measuring instrument and an outer contour of said seal.

8. The angle measuring instrument of claim 4, wherein the greatest distance between said center cross section of said angle measuring instrument and an outer contour of said front face is greater than or equal to a distance between said center cross section of said angle measuring instrument and an outer contour of said seal.

9. The angle measuring instrument of claim 1, wherein said conduit leads radially outward from said seal and is located lower with respect to both said front face and a surface for attachment to a machine.

10. The angle measuring instrument of claim 1, wherein said seal is connected, fixed against relative rotation, with said inner component.

11. The angle measuring instrument of claim 1, wherein said inner component comprises a rotor and said outer component comprises a stator.

12. An angle measuring instrument comprising:
   an outer component comprising a front face;
   an inner component, wherein said outer component is rotated relative to said inner component about an axis of rotation and said outer component lies further from said axis of rotation than said inner component along a radial direction with respect to said axis of rotation;
   a graduation attached to said inner component;
   a scanning unit that scans said graduation;
   a seal formed between said outer component and said inner component; and
   wherein said front face comprises a conduit, which leads radially outward and is located lower with respect to said front face.

13. A machine tool comprising:
a rotatable element that rotates about an axis of rotation; and
an angle measuring instrument comprising:
an outer component comprising a front face;
an angle measuring structure located within said outer component and said angle measuring structure generates position signals;
an inner component coupled to said rotatable element, wherein said outer component is rotated relative to said inner component about said axis of rotation and said outer component lies further from said axis of rotation than said inner component along a radial direction with respect to said axis of rotation;
a seal formed between said outer component and said inner component; and
wherein said front face comprises a conduit, which leads radially outward and is located lower with respect to said front face.

14. The machine tool of claim 13, wherein said rotatable element comprises a turntable.

15. A processing center comprising:
a rotatable element that rotates about an axis of rotation; and
an angle measuring instrument comprising:
an outer component comprising a front face;
an angle measuring structure located within said outer component and said angle measuring structure generates position signals;
an inner component coupled to said rotatable element, wherein said outer component is rotated relative to said inner component about said axis of rotation and said outer component lies further from said axis of rotation than said inner component along a radial direction with respect to said axis of rotation;
a seal formed between said outer component and said inner component; and
wherein said front face comprises a conduit, which leads radially outward and is located lower with respect to said front face.

16. A printing press comprising:
a rotatable element that rotates about an axis of rotation; and
an angle measuring instrument comprising:
an outer component comprising a front face;
an angle measuring structure located within said outer component and said angle measuring structure generates position signals;
an inner component coupled to said rotatable element, wherein said outer component is rotated relative to said inner component about said axis of rotation and said outer component lies further from said axis of rotation than said inner component along a radial direction with respect to said axis of rotation;
a seal formed between said outer component and said inner component; and
wherein said front face comprises a conduit, which leads radially outward and is located lower with respect to said front face.

17. The angle measuring instrument of claim 1, wherein said angle measuring structure comprises:
a graduation; and
a scanning unit that scans said graduation.

18. The angle measuring instrument of claim 17, wherein said angle measuring structure further comprises photo elements that receive light from said graduation so as to generate said position signals.

19. The machine tool of claim 13, wherein said angle measuring structure comprises:
a graduation; and
a scanning unit that scans said graduation.

20. The machine tool of claim 19, wherein said angle measuring structure further comprises photo elements that receive light from said graduation so as to generate said position signals.

* * * * *